US009451531B2

(12) United States Patent
Lee et al.

(10) Patent No.: US 9,451,531 B2
(45) Date of Patent: Sep. 20, 2016

(54) METHOD AND SYSTEM FOR MANAGING WIRELESS ACCESS TO A COMMUNICATION SYSTEM

(71) Applicant: AT&T Mobility II LLC, Atlanta, GA (US)

(72) Inventors: Bo Lee, Alpharetta, GA (US); Arthur Brisebois, Cumming, GA (US); Adrianne Luu, Roswell, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 323 days.

(21) Appl. No.: 14/085,785

(22) Filed: Nov. 20, 2013

(65) Prior Publication Data

US 2015/0138963 A1 May 21, 2015

(51) Int. Cl.
*H04W 48/04* (2009.01)
*H04W 88/04* (2009.01)
*H04W 40/22* (2009.01)
*H04W 4/02* (2009.01)
*H04W 88/06* (2009.01)

(52) U.S. Cl.
CPC ............. *H04W 48/04* (2013.01); *H04W 88/04* (2013.01); *H04W 4/027* (2013.01); *H04W 40/22* (2013.01); *H04W 88/06* (2013.01)

(58) Field of Classification Search
CPC ..... H04L 45/12; H04L 45/02; H04L 45/123; H04L 45/124
See application file for complete search history.

(56) References Cited

U.S. PATENT DOCUMENTS

| 7,720,021 | B1* | 5/2010 | Zhou ................... H04W 88/04 370/315 |
| 7,949,784 | B2 | 5/2011 | Van Datta |
| 8,103,215 | B2 | 1/2012 | Rek |
| 8,107,981 | B2 | 1/2012 | Byun et al. |
| 9,036,603 | B2* | 5/2015 | Johnsson ............... H04W 24/04 370/329 |
| 2003/0044654 | A1 | 3/2003 | Holt |
| 2005/0144316 | A1* | 6/2005 | Loo ..................... H04Q 3/0079 709/238 |
| 2005/0249238 | A1* | 11/2005 | Haumont ............... H04L 67/14 370/466 |
| 2007/0270125 | A1* | 11/2007 | Pousti ................... G06Q 20/16 455/406 |
| 2008/0102817 | A1 | 5/2008 | Shenassa et al. |
| 2008/0276085 | A1* | 11/2008 | Davidson ........... H04L 63/0272 713/161 |

(Continued)

*Primary Examiner* — Benjamin H Elliott, IV
(74) *Attorney, Agent, or Firm* — Gustin & Gust, PLC; Andrew Gust (57) ABSTRACT

A method that incorporates the subject disclosure may include, for example, transmitting movement information for the mobile communication device to a cellular network, receiving a request from a first communication device of a plurality of communication devices to access the cellular network through the mobile communication device, where the plurality of communication devices are coupled to the plurality of communication devices via a wireless local area network and wherein the mobile communication device is coupled to the cellular network, and providing access to the cellular network for the first communication device responsive to the cellular network determining that the mobile communication device has a required network capability based on the movement information and according to the request. Other embodiments are disclosed.

20 Claims, 5 Drawing Sheets

(56) References Cited

U.S. PATENT DOCUMENTS

| | | |
|---|---|---|
| 2009/0310570 A1 | 12/2009 | Smith |
| 2010/0081385 A1 | 4/2010 | Lin et al. |
| 2011/0222451 A1* | 9/2011 | Peisa ................ H04W 52/0225 370/311 |
| 2012/0158991 A1 | 6/2012 | Ajjaguttu et al. |
| 2012/0185583 A1 | 7/2012 | Wu et al. |
| 2012/0250531 A1 | 10/2012 | Patil et al. |
| 2013/0093600 A1* | 4/2013 | Cumeralto ............ H04W 40/10 340/870.01 |
| 2013/0095786 A1 | 4/2013 | Bradburn |
| 2013/0150052 A1* | 6/2013 | Zisimopoulos ....... H04W 48/18 455/437 |
| 2014/0233546 A1* | 8/2014 | Vallabhu ............... H04W 8/005 370/338 |
| 2014/0295851 A1* | 10/2014 | Kubota ............. H04W 36/0083 455/441 |

\* cited by examiner

METHOD AND SYSTEM FOR MANAGING WIRELESS ACCESS TO A COMMUNICATION SYSTEM

FIELD OF THE DISCLOSURE

The subject disclosure relates to a method and system for managing wireless access to a communication system.

BACKGROUND

Communication systems, such as a mobile communications system, can be used for providing various services, including voice, video and/or data services, and user location information can be important for next generation IP multi-media services provided by telecommunication systems As the number of users and their service requirements increase, the load on the network increases. Infrastructure expansion and improvement can lessen the network load but is costly.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments of a method and system for providing network access to a mobile device via alternative radio access technologies. The exemplary embodiments manage network routing options for User Equipment (UE), or mobile communication devices operating at a Long Term Evolution (LTE) network. The mobile communication devices can wirelessly communicate with the LTE network using an LTE Radio Access Technology (RAT), such as Evolved Universal Terrestrial Radio Access Network (E-UTRAN).

A large density of mobile devices operating in an area can create an overloading of cellular network resources. Where network resources are managed on a "per user" basis, each user device is authenticated, registered, and communicates independently with the communications system. As a result, when a high density of mobile devices are operating in an area, such as a shopping mall, sporting event, or campus, then the independent use of system resources can create substantial network congestions and, in some cases, denial of service, if the number of users exceeds the available resources. By accessing additional communication resources and using these resources to share network resources between multiple mobile devices, a system 100 can reduce network congestion and enable greater numbers of devices to use limited system resources.

One embodiment of the subject disclosure is a mobile communication device that includes a memory to store executable instructions and a processor coupled to the memory, where the processor, responsive to executing the executable instructions, can perform operations comprising connecting to a cellular network via a cellular transceiver and connecting to a wireless local area network via the wireless transceiver. The processor can also perform operations for receiving first information associated with a plurality of communication devices that are connected to the wireless local area network and, in turn, transmitting the first information to the cellular network. The processor can also perform operations comprising capturing movement information for the mobile communication device and, in turn, transmitting the movement information to the cellular network, where the cellular network determines whether the mobile communication device has a required networking capability for serving as an anchored device according to the movement information and the first information. The processor can perform operations comprising receiving from the cellular network an identification of the mobile communication device as the anchored device for the plurality of communication devices to access the cellular network via the wireless local area network responsive to the cellular network determining that the mobile communication device has the required networking capability. The processor can further perform operations for receiving a request from a first communication device of the plurality of communication devices to access the cellular network and, in turn, providing access to the cellular network for the first communication device via the cellular transceiver and the wireless transceiver.

One embodiment of the subject disclosure includes a computer-readable storage device, comprising executable instructions that, responsive to being executed by a processor, cause the processor to perform operations comprising receiving, over a cellular network, movement information for a mobile communication device. The executable instructions can cause the processor to perform operations for receiving, over the cellular network, first information from the mobile communication device, where the first information is associated with a plurality of communication devices connected to the mobile communication device via a wireless local area network. The executable instructions can also cause the processor to perform operations for determining whether the mobile communication device has a required networking capability for serving as an anchored device according to the movement information and the first information. The executable instructions can further cause the processor to perform operations for identifying the mobile communication device as an anchored device responsive to the determining that the mobile communication device has the required networking capability. The executable instructions can further cause the processor to perform operations for establishing a first cellular communication session for a first communication device of the plurality of communication devices through the mobile communication device via the wireless local area network according to the identifying of the mobile communication device as the anchored device.

One embodiment of the subject disclosure can include a method, comprising transmitting, by a mobile communication device comprising a processor, movement information for the mobile communication device to a cellular network.

The method can also include receiving, by the mobile communication device, a request from a first communication device of a plurality of communication devices to access the cellular network through the mobile communication device, where the plurality of communication devices are coupled to the plurality of communication devices via a wireless local area network and where the mobile communication device is coupled to the cellular network. The method can further comprise providing, by the mobile communication device, access to the cellular network for the first communication device responsive to the cellular network determining that the mobile communication device has a required network capability based on the movement information and according to the request.

Figure 1:
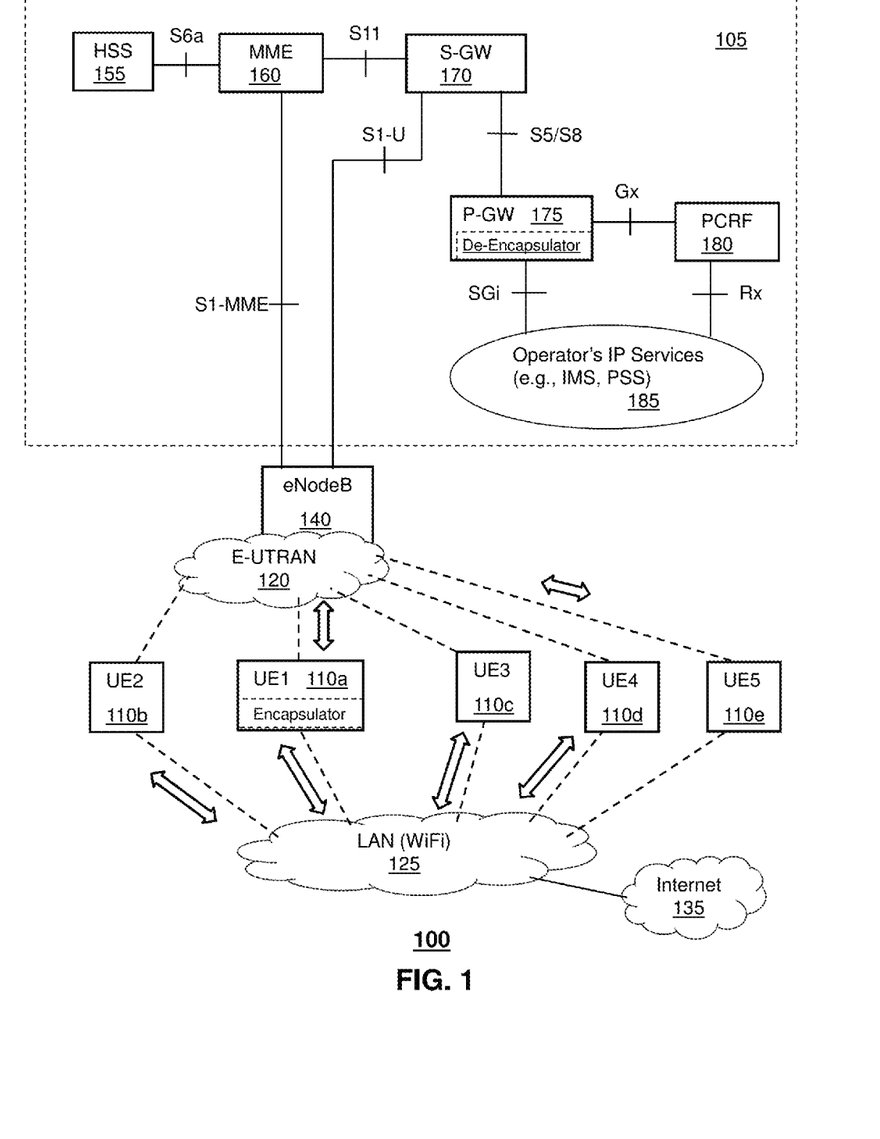
FIG. 1 depicts an illustrative embodiment of a cellular system for providing cellular network access to a communications device via an anchor, mobile communication device.

FIG. 1 depicts an illustrative embodiment of a system 100 that can provide wireless network sharing between multiple communication devices using an anchored device. Herein, the term anchored device refers to a "hub" through which data communications for two or more end user devise are routed. A large density of mobile devices operating in an area can create an overloading of cellular network resources. When a high density of mobile devices are operating in an area, such as a shopping mall, then independent use of system resources by each device can create substantial network congestions and, in some cases, denial of service, if the number of users exceeds the available resources. By accessing additional communication resources and using these resources to share network resources between multiple mobile devices, a system 100 can reduce network congestion and enable greater numbers of devices to use limited system resources. It is found that network control resources can become a bottleneck in the communications system 100 if these resources are overloaded with too many users and/or associated signaling activity.

In FIG. 1, a mobile communication system 100 is illustrated that can provide communication services, including voice, video and/or data services to mobile devices, such as mobile communication device, or end user device 110. System 100 can enable communication services over a number of different networks, such as between end user devices (UE1-UE5) 110a-e and another communication device (e.g., a second end user device) not shown. The end user devices 110a-e can be a number of different types of devices that are capable of voice, video and/or data communications, including a mobile device (e.g., a smartphone), a personal computer, a set top box, and so forth. In one or more embodiments, a first end user device (UE1) 110a can be a smart mobile communication device that includes a cellular transceiver for communicating with a cellular system, such as a Long-Term Evolution (LTE) system 105, and that includes a short distance wireless transceiver, such as a Wi-Fi transmitter, for communicating with a wireless local area network (LAN) 125. In one embodiment, the short distance wireless transceiver can be a Bluetooth wireless transceiver.

System 100 can include multiple end user devices (UE1-UE5) 110a-e, a primary Long-Term Evolution (LTE) Radio Access Technology (RAT) network 120, such as E-UTRAN, and a secondary RAT network (not shown), such as a Universal Mobile Telecommunications System (UMTS), a Global System for Communications (GSM) network, Evolution Data Only (EVDO) network, or a Code Division Multiple Access (CDMA) network. The system 100 can further include a Mobility Management Entity (MME) 160. Other components not shown can also be utilized for providing communication services to a UE 110a, such as a Mobile Switching Center (MSC) which can facilitate routing voice calls and Short-Message Service (SMS), as well as other services (e.g., conference calls, FAX and circuit switched data) via setting up and releasing end-to-end connections, handling mobility and hand-over requirements during the communications, and/or performing charging and real time pre-paid account monitoring.

In one or more embodiments, in primary mode (i.e., not fallback) E-UTRAN 120 can include one or more eNodeB 140 and radio network controllers which enable carrying many traffic types including real-time circuit-switched to IP-based packet switched traffic. In one or more embodiments, E-UTRAN 120 can also enable connectivity between the end user device 110a and the core network 105. E-UTRAN 120 can utilize a number of interfaces including Iu, Uu, Iub and/or Iur. In one or more embodiments, UNTS 130 can facilitate communications between base stations (e.g., Ater and Abis interfaces) and base station controllers (e.g., A interfaces).

In one or more embodiments, E-UTRAN 120 can be the air interface for an LTE upgrade path for mobile networks according to the 3GPP specification. E-UTRAN 140 can include one or more eNodeB nodes on the network that are connected to each other such as via X2 interfaces and which are further connectable to the packet-switch core network 105 via an Si interface. For example, E-UTRAN 120 can use various communication techniques including orthogonal frequency-division multiplexing (OFDM), multiple-input multiple-output (MIMO) antenna technology depending on the capabilities of the terminal, and beam forming for downlink to support more users, higher data rates and lower processing power required on each handset.

In one or more embodiments, a Home Subscriber Server (HSS) 155 can be provided that is a central database that contains user-related and subscription-related information. The functions of the HSS 155 include functionalities such as mobility management, call and session establishment support, user authentication and access authorization. In one embodiment, the HSS 155 can manage subscription-related information in real time, for multi-access and multi-domain offerings in an all-IP environment. The HSS 155 can be based on Home Location Register (HLR) and Authentication Center (AuC).

In one or more embodiments, MME 160 can perform the function of a control-node. For example, the MME 160 can perform functions such as idle mode tracking and paging procedure including retransmissions. The MME 160 can also choose a serving gateway for the end user device 110a such as at the initial attach and at time of intra-LTE handover involving node relocation. MME 160 and HHS 155 can be accessed when the end-user device 110a attempts to re-register to user E-UTRAN 120 to access the core network 105.

In one or more embodiments, a Serving Gateway (S-GW) 170 can route and forward user data packets, while also acting as the mobility anchored device for the user plane during inter-eNodeB handovers and as the anchored device for mobility between LTE and other 3GPP technologies (e.g., terminating S4 interface and relaying the traffic between 2G/3G systems and P-GW 175). For idle state UEs 110a, the S-GW 170 can terminate the downlink data path and can trigger paging when downlink data arrives for the UE 110a. The S-GW 170 can manage and can store UE 110a contexts, e.g. parameters of the IP bearer service, network internal routing information.

In one or more embodiments, a PDN Gateway (P-GW) 175 can provide connectivity from the UE 110a to external packet data networks by being the point of exit and entry of traffic for the UE 110a. UE 110a can have simultaneous connectivity with more than one P-GW 175 for accessing multiple PDNs. The P-GW 175 can perform policy enforcement, packet filtering for each user, charging support, lawful interception and/or packet screening. The P-GW 175 can also act as the anchored device for mobility between 3GPP and non-3GPP technologies such as WiMAX and 3GPP2 (CDMA 1X and EvDO).

In one or more embodiments, a Policy Control Resource Function (PCRF) 180 can be provided. For example, the PCRF 180 can be a software node designated in real-time to determine policy rules. As a policy tool, the PCRF 180 can operate at the network core and can access subscriber databases and other specialized functions, such as a charging system, in a centralized manner. The PCRF 180 can aggregate information to and from the network, operational support systems, and other sources (such as portals) in real time, supporting the creation of rules and then automatically making policy decisions for each subscriber active on the network. The PCRF 180 can provide a network agnostic solution (e.g., wire line and/or wireless) and can be integrated with different platforms like billing, rating, charging, and subscriber database or can also be deployed as a standalone entity. The functions performed by the PCRF 180 can be any variety of functions, such as computer implemented steps in a process or algorithm associated with operation of a mobile communications network.

In one or more embodiments, system 100 can enable smart mobile devices (UE1-UE5) 110a-e that include multiple technologies (e.g., cellular transceivers and Wi-Fi transceivers) to make an intelligent radio network that shares data across cellular and Wi-Fi technologies to improve cellular network capacity. A group of end user devices 110a-e can be located in a cellular service area that is serviced by, for example, E-TRAN 120 and eNodeB 140. If each end user device 110a-e is coordinated individually by the LTE network 105, then each device 110a-e has to be registered separately and issued a portion of the bandwidth of a Serving Gateway (S-GW) 170. As a result, if a large number of end user devices 110a-e are present in a service area then the available spaces for registered devices can be exhausted, even before the system 100 runs out of data bandwidth.

In one or more embodiments, a wireless local area network (LAN) 125 can be present at a service. The LAN 125 can be designed to provide wireless access to the Internet 135 for devices 110a-e that can be coupled to the LAN 125. For example, the LAN 125 can be located at a public place, such as shopping mall, a college campus, a large church, an airport, a commercial location, or a sporting venue. In one embodiment, the LAN 125 can provide access freely to devices 110a-e with or without authenticating access. For example, the LAN 125 can require that each device 110a-e enter a name and/or password to authorize access. In one embodiment, access to the LAN 125 can be limited to devices 110a and/or subscribers associated with the LTE network 105. The LTE service provider can provide and/or partner with a provider to make sure that wireless LAN capability is available to its subscribers and/or subscribed devices 110a-e at specific locations. In another embodiment, access to the LAN 125 can be protected via a machine code or identifier or by a digital certificate. This approach can provide limited access to LAN 125 to protect the bandwidth of the LAN 125 while not inconveniencing a user of an end user device 110a with a need to enter authenticating information when activating a connection to the LAN 125. In another embodiment, the LAN 125 can be open for access to any wireless device without a protective password. For example, a public building can offer free, wireless access to the Internet 135 via a wireless LAN 125 as an enticement for people to visit. In one embodiment, the wireless LAN 125 can communicate with end user devices 110a-e via a wireless communication link, such as WiFi and/or Bluetooth technology.

In one or more embodiments, end user devices 110a-e can be coupled to the wireless LAN 125 and to the cellular network 105. During normal operation, an end user device 110a will normally be connected to the cellular network 105 to which the device 110a is subscribed, assuming that the cellular network 105 is available at the location. In one embodiment, the cellular network 105 can collect information from the end user devices 110a-e that are connected to the cellular network 105 to assess actual and relative networking capabilities of the devices 110a-e. For example, information regarding parameters, such as battery power, device location, device movement, active applications, historical usage, and signal strength, can be collected for the end user devices 110a-e. An element of the cellular network 105, such as the eNodeB 140, the MME 160, and/or the S-GW 170, can collect and evaluate the information to assess which end user device 110A is best able to function as an anchored device for cellular communications of the other devices 110b-e. In one or more embodiment, the cellular network 105 determine which end user device 110a, if any, meets minimum requirements for connectivity to both the cellular network 105 and the wireless LAN 125, good signal strength, and a well-charged battery for handling routing cellular communications for other end user devices 110b-e. In one or more embodiments, the cellular network 105 can determine if the end user 110a is executing any applications that are likely to use substantial processing power, memory, and/or bandwidth, and, consequentially, not have these resources available for serving as the anchored device.

In one or more embodiments, the cellular network can determine a location for each device 110a. For example, the device 110a can report a location based on an on-board global positioning system (GPS) function. The cellular network 105 can determine if the end user device 110a is located in an area with good coverage from the wireless LAN 125 and the cellular network E-UTRAN 120. Generally, the end user device 110a should not only have excellent coverage and signal strength but should be able to maintain these levels if the end user device 110a is moved a nominal distance. For example, the cellular network 105 can designate a mobile cellular device 110a as an anchored device of an area covered by cellular RAT E-UTRAN 120 and by wireless LAN 125 and can further assess a likelihood that typical movements of the mobile cellular device 110a within both of these wireless coverage areas will not be jeopardized by a user walking around within the coverage areas. If the cellular network 105 detects that the end user device 110a is located at or near an edge of the cellular and/or wireless coverage areas, then the cellular network 105 can flag the device 110a as too risky to be identified as the anchored device.

In one or more embodiments, the cellular network 105 can determine if the end user device 110a is moving and, if moving, then it can further determine a direction and speed of movement. For example, the end user device 110a can report a series of locations and timestamps to the cellular network 105. The locations and timestamps can be converted into movement information. Alternatively, the end user device 110a can convert location information directly into movement information and report the movement information to the cellular network 105. If an end user device 110*a* is determined to be moving, then the cellular network 105 can eliminate this end user device 110*a* as a candidate for an anchored device. Alternatively, the cellular network 105 can determine if the movement would likely take the device 110*a* out of the coverage ranges for E-UTRAN 120 and the wireless LAN 125 and, if not, then retain the device 110*a* as a possible candidate.

In one or more embodiments, the cellular network 105 can assess the battery power of each end user device 110*a* in the service area and, further, whether the device 110*a* is connected to a charging source. A device with a low battery charge can be excluded from consideration for anchored device. In one embodiment, the cellular network 105 can determine a present quality of service (QoS) for each candidate end user device 110*c*. A minimum QoS threshold can be used to determine the anchored device. Alternatively, several anchored device candidates can be determined, with each operating at a different QoS level, to allow for a choice of service levels—perhaps keyed to different levels of subscription service and/or service charges.

In one or more embodiments, the cellular network 105 can assess, from a pool of end user devices 110*a-e* that meet minimum requirements for location, connectivity, QoS, battery power, and the like. If no devices meet the minimum requirements, then no devices are assigned as anchored devices. The cellular network 105 can determine end user devices 110*a-e* that best fit the requirements and can assign one or more devices as anchored devices.

In one or more embodiments, once an anchored device 110*a* is designated, then the cellular network 105 can notify the selected device 110*a* and can cause the device to download required software for performing the anchored device function. For example, the anchored device 110*a* can require a function for encapsulating data packets for another end user device, such as UE3 110*b*, that is serviced by the anchored device 110*a*. Similarly, the P-GW for the LTE cellular network 105 can include a function for de-encapsulating data packets that are encapsulated by the anchored device 110*a*. The system 100 can thereby transmit and receive data and voice information for any of end user device 110*b*, via the anchored device 110*a*, and have the information properly processed as terminating at the end user device 110*b*.

In another embodiment, the cellular network 105 can authenticate the anchored device 110*a* and other end user devices 110*b-e* in the service area. After authentication, the cellular network 105 can exclude one or more of the user devices 110*b-e* from using the anchored device 110*a*. A device 110*e* that is excluded from using the anchored device 110*a* will remain registered with the cellular network 105 and will continue to communicate directly with the cellular network 105 via E-UTRAN 120 without accessing the anchored device 110*a*. However, end user devices 110*b-d* that are included in the anchored device 110*a* subsystem can be logged off from direct registration with the cellular network 105. Further communications between these remaining end user devices 110*b-d* are routed through the wireless LAN 125 and the anchored device 110*a*. As a result, a number of end user devices 110*b-d* are no longer registered directly to the cellular network 105 and, hence, operating resources that were assigned to these devices 110*b-d* can be released to the cellular network 105 to improve performance and to facilitate effectively supporting greater numbers of end user devices.

In one embodiment, the anchored device 110*a* can invoke a session initiation protocol (SIP) session initiation protocol with nearby end user devices 110*b-d* that have been authenticated by the cellular network 105 and indicated as being subject to the anchored device 110*a*. Context information for each connection between the anchored device 110*a* and the end user devices 110*b-d*, through the wireless LAN 125, can be transported via the wireless LAN 125.

In one embodiment, the cellular network 105 can track connections between end user devices 110*b-d* and services of the cellular network that are completed via the anchored device 110*a*. From the perspective of the cellular network 105, transactions through the anchored device 110*a* express a real connectivity that only includes the anchored device 110*a*. However, the virtual connectivity only involves the end user device 110*c* and the cellular network 105 with the anchored device simply acting as a routing mechanism. The cellular network 105 invokes a function to detect instances of "network sharing via device network" and accounts the billing for services, if applicable, according to the terminating end user device 110*c*.

In one embodiment, the cellular network 105 can notify end user devices 110*b-e* if an anchored device 110*a* is added, subtracted, or if multiple anchored devices are available. The QoS for each anchored device 110*a* can be determined and promoted to the end user devices 110*b-e* to encourage usage, to facilitate user choice, and/or to facilitate user tradeoffs of cost and performance.

Figure 2:
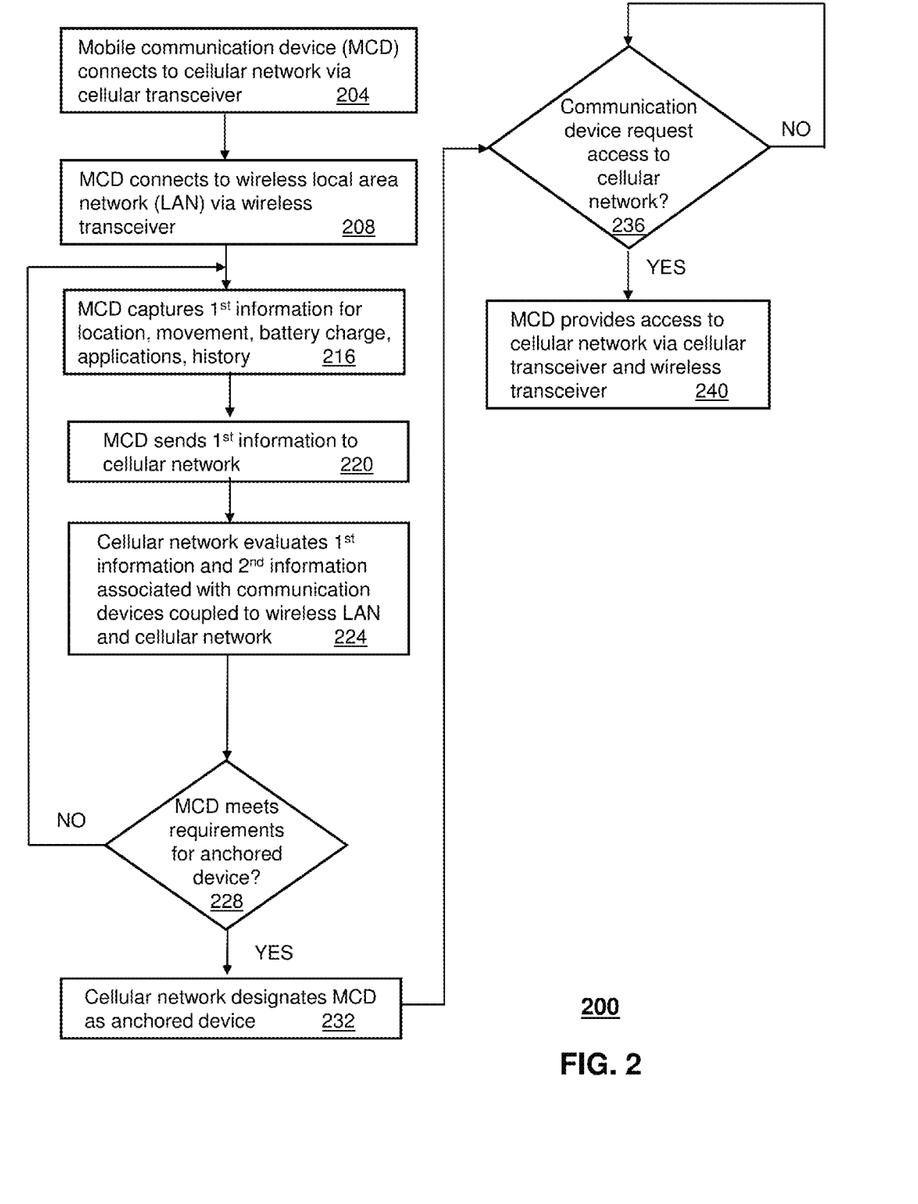
FIG. 2 depicts an illustrative embodiment of a method for providing cellular network access to a communications device via an anchor, mobile communication device.

FIG. 2 depicts an illustrative embodiment of a method for. Method 200 can begin at 202 with an end-user device 110*a* connecting to a service provider via a first radio access technology (RAT). For example, the end-user device 110*a* can connect to an LTE system 100 via E-UTRAN 120. The end-user device 110*a* can access core functions 105 to transmit and/or receive packet-switched data via the LTE system using a highest speed wireless front-end.

In step 208, the end user device 110*a* can connect to a wireless local area network (LAN) 125 via a wireless transceiver of the end user device 110*a*. The LAN 125 can be designed to provide wireless access to the Internet 135 for devices 110*a-e* that can be coupled to the LAN 125. In step 212, the end-user device 110*a* set a time period for delaying requesting reentry to the first RAT. The end user device 110*a* can receive information regarding communication devices In step 216, the end-user device 110*a* can capture first information for location, movement, battery charge, executing application, application history, and the like, for the end-user device 110*a*. In one or more embodiments, the cellular network 105 can determine if the end user device 110*a* is moving and, if moving, then it can further determine a direction and speed of movement. For example, the end user device 110*a* can report a series of locations and timestamps to the cellular network 105. The locations and timestamps can be converted into movement information. Alternatively, the end user device 110*a* can convert location information directly into movement information and report the movement information to the cellular network 105. In step 220, the end-user device 110*a* can send the first information to the cellular network 105.

In step 224, the cellular network 105 can evaluate the first information regarding the capabilities of the end-user device 110*a* and, further, the second information regarding all the end-user devices 110*a* that are coupled to the wireless LAN 125 and the cellular network 105. In step 228, the cellular network 105 can determine if an end user device 110*a* meets the requirements for an anchored device. An element of the cellular network 105, such as the eNodeB 140, the MME 160, and/or the S-GW 170, can collect and evaluate the information to assess which end user device 110A is best able to function as an anchored device for cellular communications of the other devices 110b-e. In one or more embodiment, the cellular network 105 determine which end user device 110a, if any, meets minimum requirements for connectivity to both the cellular network 105 and the wireless LAN 125, good signal strength, and a well-charged battery for handling routing cellular communications for other end user devices 110b-e. In one embodiment, the cellular network can obtain cellular and WIFI signal strength information from candidate anchor devices. In one embodiment, the signal strength information can be collected using a query of survey data (i.e., pulling the information). In one embodiment, the signal strength information can be collected using in-call measurement reports (i.e., pushing the information).

In step 232, the cellular network 105 can designate an end user device 110a as the anchored device. In one or more embodiments, the cellular network 105 can assess, from a pool of end user devices 110a-e that meet minimum requirements for location, connectivity, QoS, battery power, and the like. If no devices meet the minimum requirements, then no devices are assigned as anchored devices. The cellular network 105 can determine end user devices 110a-e that best fit the requirements and can assign one or more devices as anchored devices.

In step 236, the end-user device 110a can detect a request by another end user device 110b for access to the cellular network 105 via and, in step 240, can provide access by routing the request to the cellular network 105.

Figure 3:
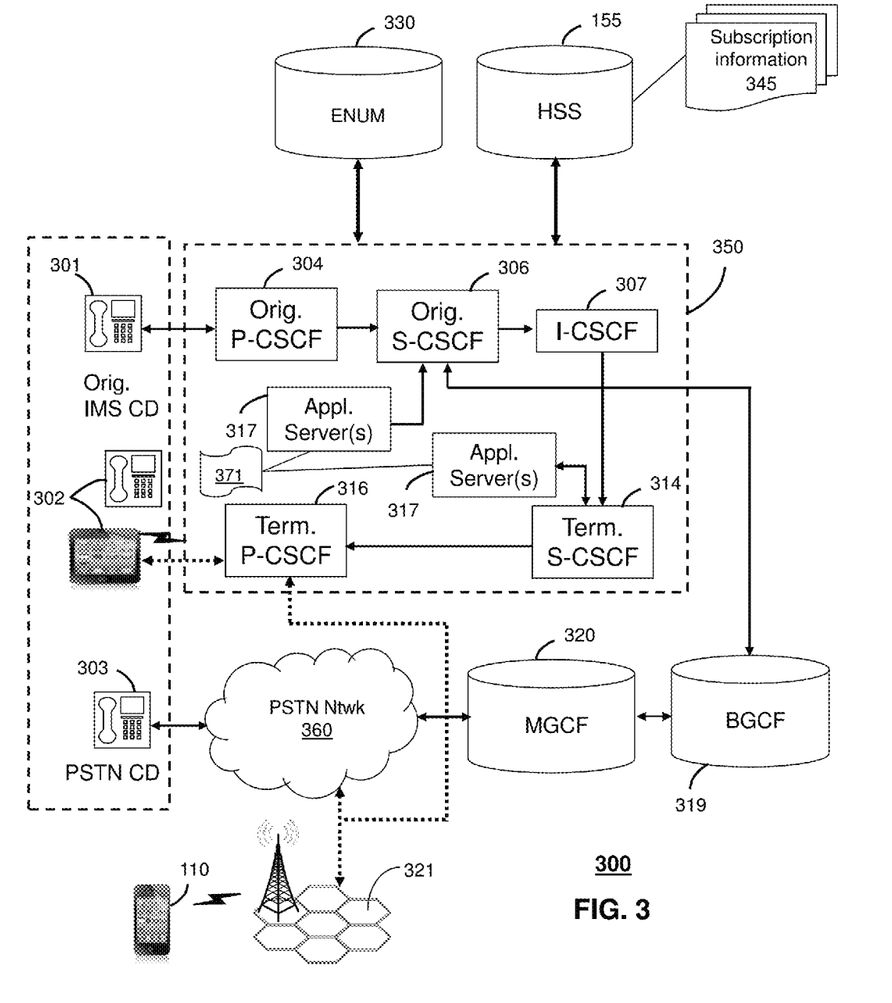
FIG. 3 depicts an illustrative embodiment of the cellular system for providing network access to a mobile device via alternative radio access technologies.

FIG. 3 depicts an illustrative embodiment of the cellular system for accessing additional communication resources and using these resources to share network resources between multiple mobile devices. Communication system 300 can be overlaid or operably coupled with systems 100 of FIG. 1 as another representative embodiment of communication system 100. System 300 allows for selecting an anchored device 110a that can route, though the wireless and cellular interfaces of the anchored device 110a, cellular communications for user devices 110 b-d and the cellular network 105.

Communication system 300 can comprise a Home Subscriber Server (HSS) 340, a tElephone NUmber Mapping (ENUM) server 330, and other network elements of an IMS network 350. The HSS 155 can receive subscription information 345, such as from PCRF 180 of FIG. 1). The subscription information 345 can be stored and used for a session event reporting registration process for subscribing devices (e.g., application servers 317 selectively requesting ULI). In one embodiment, the HSS 155 can report ULI, such as by querying PCRF, which will report upon detection of session events identified in subscription information while not reporting other ULI for session events that are not identified in subscription events.

The IMS network 350 can establish communications between IMS-compliant communication devices (CDs) 301, 302, Public Switched Telephone Network (PSTN) CDs 303, 305, and combinations thereof by way of a Media Gateway Control Function (MGCF) 320 coupled to a PSTN network 360. The MGCF 320 need not be used when a communication session involves IMS CD to IMS CD communications. A communication session involving at least one PSTN CD may utilize the MGCF 320.

IMS CDs 301, 302 can register with the IMS network 350 by contacting a Proxy Call Session Control Function (P-CSCF) which communicates with an interrogating CSCF (I-CSCF), which in turn, communicates with a Serving CSCF (S-CSCF) to register the CDs with the HSS 155. To initiate a communication session between CDs, an originating IMS CD 301 can submit a Session Initiation Protocol (SIP INVITE) message to an originating P-CSCF 304 which communicates with a corresponding originating S-CSCF 306.

The originating S-CSCF 306 can submit the SIP INVITE message to one or more application servers 317 that can provide a variety of services to IMS subscribers. For example, the application servers 317 can be used for various functions including billing and/or network performance analysis. In one embodiment, the application servers 317 can be used to perform originating call feature treatment functions on the calling party number received by the originating S-CSCF 306 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 306 can submit queries to the ENUM system 330 to translate an E.164 telephone number in the SIP INVITE message to a SIP Uniform Resource Identifier (URI) if the terminating communication device is IMS-compliant. The SIP URI can be used by an Interrogating CSCF (I-CSCF) 307 to submit a query to the HSS 340 to identify a terminating S-CSCF 314 associated with a terminating IMS CD such as reference 302. Once identified, the I-CSCF 307 can submit the SIP INVITE message to the terminating S-CSCF 314. The terminating S-CSCF 314 can then identify a terminating P-CSCF 316 associated with the terminating CD 302. The P-CSCF 316 may then signal the CD 302 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 3 may be interchangeable. It is further noted that communication system 300 can be adapted to support video conferencing. In addition, communication system 300 can be adapted to provide the IMS CDs 301, 302 with multimedia and Internet services.

If the terminating communication device is instead a PSTN CD such as CD 303 or CD 305 (in instances where the cellular phone only supports circuit-switched voice communications), the ENUM system 330 can respond with an unsuccessful address resolution which can cause the originating S-CSCF 306 to forward the call to the MGCF 320 via a Breakout Gateway Control Function (BGCF) 319. The MGCF 320 can then initiate the call to the terminating PSTN CD over the PSTN network 360 to enable the calling and called parties to engage in voice and/or data communications.

It is further appreciated that the CDs of FIG. 3 can operate as wireline or wireless devices. For example, the CDs of FIG. 3 can be communicatively coupled to a cellular base station 321, a femtocell, a WiFi router, a Digital Enhanced Cordless Telecommunications (DECT) base unit, or another suitable wireless access unit to establish communications with the IMS network 350 of FIG. 3. The cellular access base station 321 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 3.

Cellular phones supporting LTE can support packet-switched voice and packet-switched data communications and thus may operate as IMS-compliant mobile devices. In this embodiment, the cellular base station 321 may communicate directly with the IMS network 350 as shown by the arrow connecting the cellular base station 321 and the P-CSCF 316.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

Application servers 317 can be adapted to perform function 371 (e.g., via software executed at the application server) which can include subscribing to session events for selective reporting of ULI. As an example, the application server 317 can subscribe to the PCC (e.g., PCRF 180) which allows the application server 317 to selectively receive ULI based on events that are pertinent to the functions being performed by the application server without receiving unnecessary ULI for events that are not pertinent to the functions being performed by the AF. For instance, an application server 317 that is performing location-based service authorization can subscribe to session initiation events and session updates caused by user mobility while not subscribing to session terminations. In this example, the application server 317 can monitor the location of the UE based on the ULI to enforce authorization of location-based services in only a particular area. The subscribing function 371 performed by the application server 317 can result in distribution of the subscription information 345 to devices that are part of the ULI reporting process, such as HSS 155 or an MME (not shown).

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 4:
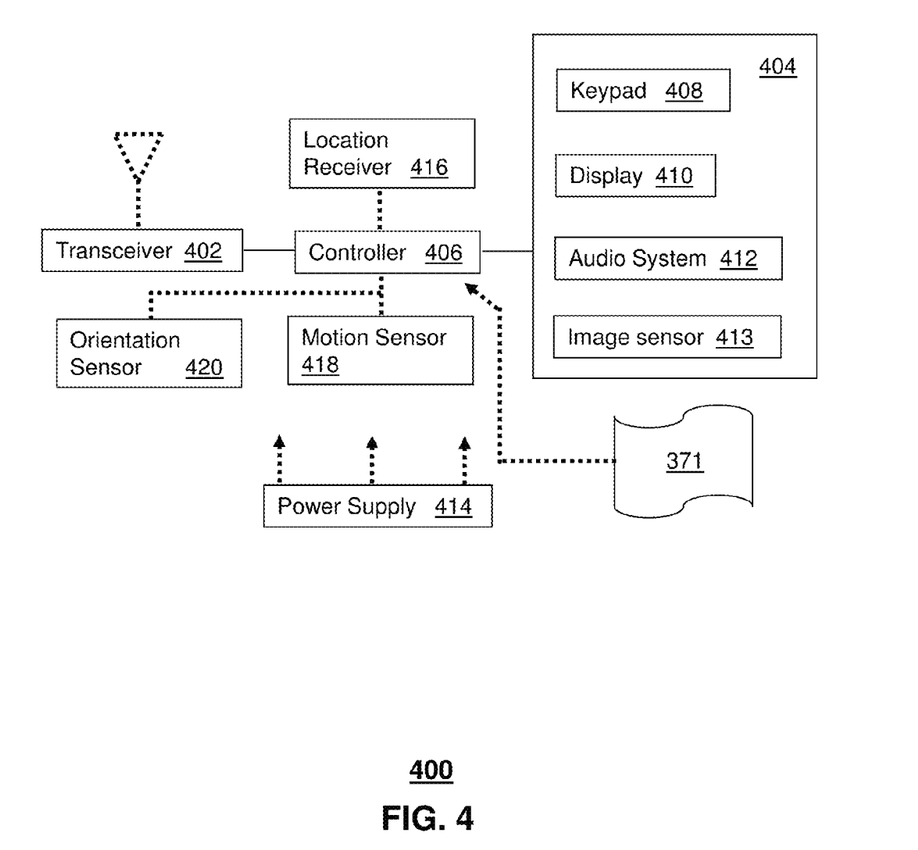
FIG. 4 depicts an illustrative embodiment of a communication device that can be used in achieving network access via alternative radio access technologies.

FIG. 4 depicts an illustrative embodiment of a communication device that can be used in achieving improved network access via an anchored device. Communication device 400 can serve in whole or in part as an illustrative embodiment of the devices depicted in FIGS. 1 and 3, including application servers, PCEF devices, PCRF devices, UEs, HSS, MME and so forth. Device 400 can be a server that performs policy control and charging functions in a mobile communications network. Device 400 can receive subscriptions from a subset of application servers of a plurality of application servers, where the subscriptions identify session events of a communication session for which the subset of application servers request user location information, or a subset of the triggering events are subscribed. Device 400 can provide subscription information based on the subscriptions to core network nodes of the mobile communications network. Device 400 can receive user location information from the core network nodes responsive to detection of triggering events corresponding to the session events of the subscriptions. Device 400 can provide the user location information to an IP multimedia subsystem network for delivery to the subset of application servers without delivery to remaining application servers of the plurality of application servers that did not subscribe to the session events, or without delivering the ULI for undesired subsequent triggering events.

To enable selective reporting of ULI via a subscriber registration process, communication device 400 can comprise various components such as one or more of a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 410 can be an integral part of the housing assembly of the communication device 400 or an independent device communicatively coupled thereto by a tethered wireline interface (such as a cable) or a wireless interface.

The UI 404 can also include an audio system 412 that utilizes audio technology for conveying low volume audio (such as audio heard in proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and/or charging system technologies for supplying energy to the components of the communication device 400 to facilitate long-range or short-range portable applications. Alternatively, or in combination, the charging system can utilize external power sources such as DC power supplied over a physical interface such as a USB port or other suitable tethering technologies.

The location receiver 416 can utilize location technology such as a global positioning system (GPS) receiver capable of assisted GPS for identifying a location of the communication device 400 based on signals generated by a constellation of GPS satellites, which can be used for facilitating location services such as navigation. The motion sensor 418 can utilize motion sensing technology such as an accelerometer, a gyroscope, or other suitable motion sensing technology to detect motion of the communication device 400 in three-dimensional space. The orientation sensor 420 can utilize orientation sensing technology such as a magnetometer to detect the orientation of the communication device 400 (north, south, west, and east, as well as combined orientations in degrees, minutes, or other suitable orientation metrics).

The communication device 400 can use the transceiver 402 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 4 can be used in one or more embodiments of the subject disclosure. For instance, the communication device 400 can include a reset button (not shown). The reset button can be used to reset the controller 406 of the communication device 400. In yet another embodiment, the communication device 400 can also include a factory default setting button positioned, for example, below a small hole in a housing assembly of the communication device 400 to force the communication device 400 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 400 as described herein can operate with more or less of the circuit components shown in FIG. 4. These variant embodiments can be used in one or more embodiments of the subject disclosure.

The communication device 400 shown in FIG. 4 or portions thereof can serve as a representation of one or more of the devices of systems 100 and/or 300 of FIGS. 1 and 3. In addition, the controller 406 can be adapted in various embodiments to perform the functions 371 to enable a subscriber registration process that distributes subscription information so that ULI is selectively reported based on particular detected session events that are pertinent to the functions of the subscribing device, such as ULI being reported for session termination events to an application server performing network performance analysis.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 5:
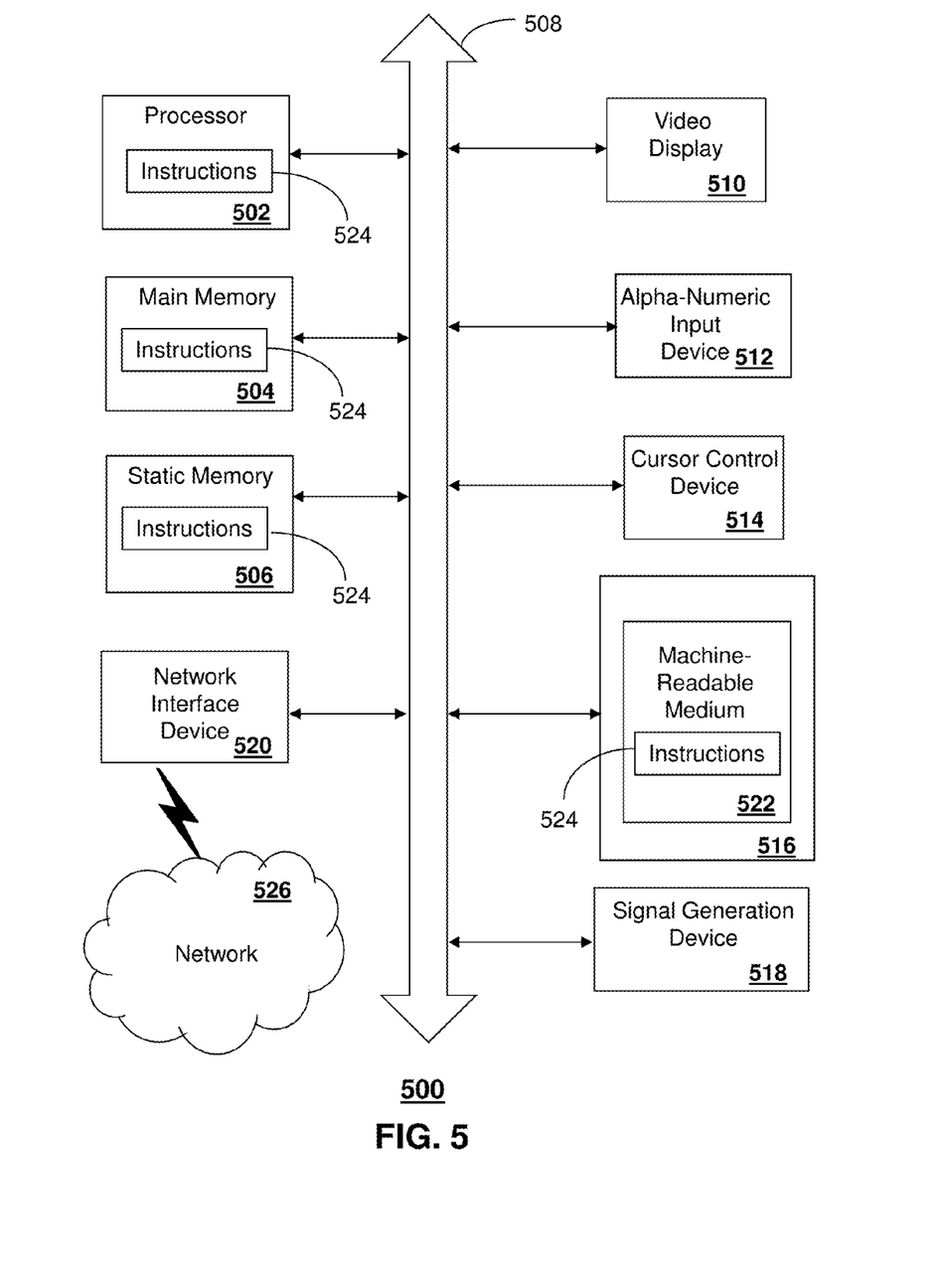
FIG. 5 is a diagrammatic representation of a machine in the form of a computer system within which a set of instructions, when executed, may cause the machine to perform any one or more of the methods described herein.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as a PCC (e.g., the PCRF 180 and/or the PCEF 220), an MME, an HSS, an application server, a UE and other devices of FIGS. 1-2 and 5-6 to enable selective ULI reporting based on a subscription process. For example, the machine can receive a subscription from an application server, where the machine performs policy control and charging functions in a mobile communications network, and where the subscription identifies a session event occurring in a communication session for which the application server requests user location information. The machine can provide subscription information based on the subscription to core network nodes of the mobile communications network. The machine can receive user location information from the core network nodes responsive to a detection of a triggering event corresponding to the session event of the subscription. The machine can provide the user location information to an IP multimedia subsystem network for delivery to the application server, where the delivery of the user location information is limited to application servers that are subscribed to the session event, and/or only for the event/sub-event an application server has subscribed.

In some embodiments, the machine may be connected (e.g., using a network 526) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 500 may include a processor (or controller) 502 (e.g., a central processing unit (CPU), a graphics processing unit (GPU, or both), a main memory 504 and a static memory 506, which communicate with each other via a bus 508. The computer system 500 may further include a display unit 510 (e.g., a liquid crystal display (LCD), a flat panel, or a solid state display. The computer system 500 may include an input device 512 (e.g., a keyboard), a cursor control device 514 (e.g., a mouse), a disk drive unit 516, a signal generation device 518 (e.g., a speaker or remote control) and a network interface device 520. In distributed environments, the embodiments described in the subject disclosure can be adapted to utilize multiple display units 510 controlled by two or more computer systems 500. In this configuration, presentations described by the subject disclosure may in part be shown in a first of the display units 510, while the remaining portion is presented in a second of the display units 510.

The disk drive unit 516 may include a tangible computer-readable storage medium 522 on which is stored one or more sets of instructions (e.g., software 524) embodying any one or more of the methods or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The exemplary embodiments described herein can be part of various communication systems including an Internet Protocol Television (IPTV) media system satellite and/or terrestrial communication systems. These systems can provide various services including voice video and/or data services. Multiple forms of media services can be offered to media devices (e.g., mobile communication devices, set top boxes, desk top computers, and so forth) over landline technologies. Additionally, media services can be offered to media devices by way of wireless technologies such as through use of a wireless access base station operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described). Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile communication device comprising:
a cellular transceiver;
a wireless transceiver;
a memory that stores executable instructions; and
a processor coupled to the memory, wherein the processor, responsive to executing the executable instructions, performs operations comprising:
connecting to a cellular network via the cellular transceiver;
connecting to a wireless local area network via the wireless transceiver;
capturing movement information for the mobile communication device;
determining a speed of movement of the mobile communication device according to the movement information;
comparing the speed of movement to a threshold to estimate a length of time when the mobile communication device is predicted to be in range of the wireless local area network;
transmitting the movement information and the length of time to the cellular network, wherein the cellular network determines whether the mobile communication device has a required networking capability for serving as an anchored device according to the movement information, the length of time, and first information associated with a plurality of communication devices that are connected to the wireless local area network;
receiving from the cellular network an identification of the mobile communication device as the anchored device for the plurality of communication devices to access the cellular network via the wireless local area network responsive to the cellular network determining that the mobile communication device has the required networking capability;
receiving a request from a first communication device of the plurality of communication devices to access the cellular network; and
providing access to the cellular network for the first communication device via the cellular transceiver and the wireless transceiver.

2. The mobile communication device of claim 1, wherein the processor further performs operations comprising:
monitoring battery charging information associated with the mobile communication device; and
transmitting the battery charging information to the cellular network, wherein the cellular network further determines whether the mobile communication device has a required networking capability for serving as an anchored device according to the battery charging information.

3. The mobile communication device of claim 2, wherein the identification of the anchored device is received by the plurality of communication devices according to a promotion of a differential quality of service access option.

4. The mobile communication device of claim 1, wherein the processor further performs operations comprising:
monitoring active applications operating at the mobile communication device; and
transmitting second information associated with the active applications to the cellular network.

5. The mobile communication device of claim 4, wherein the cellular network further determines whether the mobile communication device has a required networking capability for serving as an anchored device according to the second information.

6. The mobile communication device of claim 1, wherein the first communication device is logged off from a registered connection to the cellular network responsive to the identification of the mobile communication device as the anchored device.

7. The mobile communication device of claim 1, wherein the processor further performs operations comprising:
    invoking a plurality of session initiation protocol sessions with the plurality of communication devices over the wireless local area network; and
    receiving via a first session initiation protocol session of the plurality of session initiation protocol sessions the request from a first communication device of the plurality of communication devices to access the cellular network via the wireless local area network.

8. The mobile communication device of claim 1, wherein the processor further performs operations comprising:
    receiving a first device context of the first communication device over the wireless local area network from the first communication device; and
    transmitting the first device context to the cellular network.

9. The mobile communication device of claim 8, wherein the processor further performs operations comprising:
    encapsulating the first device context into a packet-based message via a general packet radio service, wherein the transmitting of the first device context further comprises transmitting the packet-based message to the cellular network.

10. The mobile communication device of claim 9, wherein the cellular network further de-encapsulates the packet-based message to determine the first device context.

11. The mobile communication device of claim 1, wherein the processor further performs operations comprising transmitting authenticating information associated with the mobile communication device to the cellular network, wherein each of the plurality of communication devices are authenticated by the cellular network.

12. The mobile communication device of claim 1, wherein an anchored profile for the mobile communication device is recognized by the cellular network in place of a first network profile of the first communication device.

13. The mobile communication device of claim 1, wherein the cellular network bills the access to the cellular network for the first communication device to an account associated with the first communication device.

14. The mobile communication device of claim 1, wherein the processor further performs operations comprising:
    transmitting second information associated with a network capability of the mobile communication device to the cellular network, wherein the cellular network determines whether the mobile communication device has a lost a required networking capability for serving as an anchored device according to the second information; and
    receiving a revocation of the identification of the mobile communication device as the anchored device responsive to the cellular network determining that the mobile communication device has lost the required networking capability.

15. A computer-readable storage device, comprising executable instructions that, responsive to being executed by a processor, cause the processor to perform operations comprising:
    receiving, over a cellular network, movement information and second information for a mobile communication device, wherein the second information comprises a length of time when the mobile communication device is predicted to be in range of a wireless local area network based on a speed of movement of the mobile communication device;
    receiving, over the cellular network, first information associated with a plurality of communication devices connected to the mobile communication device via the wireless local area network;
    determining whether the mobile communication device has a required networking capability for serving as an anchored device according to the movement information, the first information, and the second information;
    identifying the mobile communication device as an anchored device responsive to the determining that the mobile communication device has the required networking capability;
    terminating a registered connection between a first communication device and the cellular network responsive to identifying the mobile communication device as the anchored device; and
    facilitating establishing a first cellular communication session for the first communication device of the plurality of communication devices through the mobile communication device via the wireless local area network according to the identifying of the mobile communication device as the anchored device.

16. The computer-readable storage device of claim 15, wherein the mobile communication device provides a differential quality of service option for cellular communication between the first communication device and the cellular network.

17. The computer-readable storage device of claim 15, wherein the executable instructions further cause the processor to perform operations comprising:
    receiving a packet-based message from the mobile communication device, wherein the mobile communication device encapsulates a first device context of into a packet-based message via a general packet radio service; and
    de-encapsulating the packet-based message to determine the first device context.

18. The computer-readable storage device of claim 15, wherein the executable instructions further cause the processor to perform operations comprising billing the first cellular communication session to an account associated with the first communication device.

19. A method, comprising:
    transmitting, by a mobile communication device comprising a processor, movement information for the mobile communication device to a cellular network;
    determining, by the mobile communication device, a length of time when the mobile communication device is predicted to be in range of a wireless local area network according to a speed of movement of the mobile communication device;
    transmitting, by the mobile communication device, the length of time to the cellular network;
    receiving, by the mobile communication device, a request from a first communication device of a plurality of communication devices to access the cellular network through the mobile communication device, wherein the plurality of communication devices are coupled to a wireless local area network and wherein the mobile communication device is coupled to the cellular network; and providing, by the mobile communication device, access to the cellular network for the first communication device responsive to the cellular network determining that the mobile communication device has a required network capability based on the movement information the length of time, and according to the request.

20. The method of claim 19, further comprising monitoring, by the mobile communication device, historical active applications operating at the mobile communication device, wherein the cellular network determining that the mobile communication device has the required network capability is further based on the historical active applications operating at the mobile communication device.

\* \* \* \* \*